United States Patent [19]

Sullivan

[11] Patent Number: 5,004,283
[45] Date of Patent: Apr. 2, 1991

[54] ROTARY WEED EXTRACTOR

[75] Inventor: John F. Sullivan, Dallas, Tex.

[73] Assignee: Robert S. Scheurer, Wichita Falls, Tex.

[21] Appl. No.: 532,184

[22] Filed: Jun. 1, 1990

Related U.S. Application Data

[63] Continuation of Ser. No. 295,224, Jan. 9, 1989, abandoned.

[51] Int. Cl.⁵ ............................ A01B 1/16; A01D 9/06
[52] U.S. Cl. .......................................... 294/61; 294/50
[58] Field of Search .......................... 294/5, 50–50.7, 294/55.5, 60, 61, 120, 121, 126; 43/6; 172/21, 22, 25, 378; 254/132

[56] References Cited

U.S. PATENT DOCUMENTS

| | | | |
|---|---|---|---|
| 625,201 | 5/1899 | Proctor | 294/61 X |
| 669,841 | 3/1901 | Koeth | 294/50.5 |
| 789,177 | 5/1905 | Smith | 294/61 X |
| 944,393 | 12/1909 | Whitney | 294/50.5 X |
| 1,262,170 | 4/1918 | Bussell . | |
| 1,483,445 | 2/1924 | Holton | 294/61 |
| 1,485,300 | 2/1924 | Scott | 294/61 |
| 1,893,258 | 1/1933 | Washburn | 172/21 |
| 2,500,647 | 3/1950 | Schulthess | 294/50 X |
| 2,509,113 | 5/1950 | Sweet | 294/61 |
| 2,552,467 | 5/1951 | Thomas | 294/61 |
| 2,593,283 | 4/1952 | Erlebach | 294/50.5 X |
| 2,738,215 | 3/1956 | Thompson | 294/61 |
| 2,800,354 | 7/1957 | King | 294/50.5 X |
| 2,862,755 | 12/1958 | Gulden | 294/61 |
| 3,050,327 | 8/1962 | Kuntz | 294/50.5 |
| 3,061,270 | 10/1962 | Lowe | 254/132 |
| 3,152,788 | 10/1964 | Hardwidge | 254/132 |
| 3,180,427 | 4/1965 | Leeper | 172/21 |
| 4,081,192 | 3/1978 | Jones | 294/61 |
| 4,091,879 | 5/1978 | Lomberk et al. | 172/378 X |
| 4,603,744 | 8/1986 | Ramirez | 172/25 |
| 4,641,712 | 2/1987 | Cravotta | 172/25 |
| 4,673,165 | 6/1987 | Nelson et al. | 254/132 |
| 4,832,132 | 5/1989 | Barcelon | 294/50.5 X |

FOREIGN PATENT DOCUMENTS

| | | | |
|---|---|---|---|
| 271287 | 5/1927 | United Kingdom | 294/50.6 |
| 2119211 | 11/1983 | United Kingdom | 294/50.5 |

Primary Examiner—Johnny D. Cherry
Attorney, Agent, or Firm—Dennis T. Griggs

[57] ABSTRACT

A tool for extracting weeds without stooping, bending or personally touching the weed is disclosed. The weed extracting tool has a plurality of spikes mounted onto a block which is mounted onto the lower end of a torque bar. Spiral ribs on the spikes are force fitted within bores formed in the block resulting in an interlocking union. A spring-loaded ejector carriage is movably mounted onto the torque bar for movement between retracted and extended positions. The ejector carriage includes an ejector plate, a push plate, and side panels connecting the two plates. The ejector plate is interposed between the spikes. A weed is extracted from the soil by inserting the spikes into the ground around the central root core of the weed, rotating the torque bar to engage the weed's roots about the spikes, and then lifting the entangled weed from the ground. The weed is then expelled by manually extending the ejector carriage along the torque bar.

4 Claims, 3 Drawing Sheets

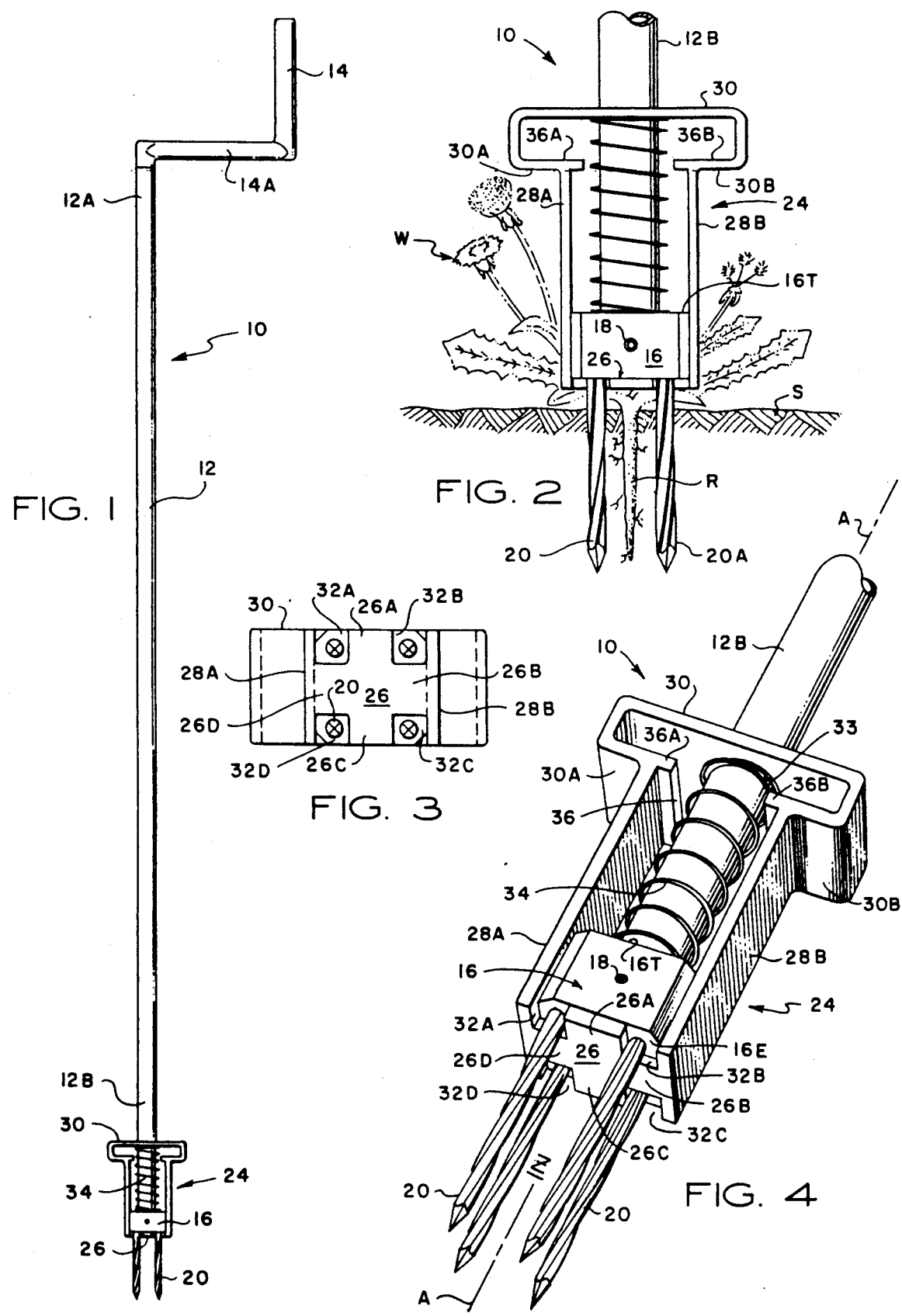

ROTARY WEED EXTRACTOR

This is a continuation of co-pending application Ser. No. 295,224 filed on Jan. 9, 1989, now abandoned.

FIELD OF THE INVENTION

The present invention relates generally to gardening tools, and in particular to a tool for extracting a weed from the soil and then expelling the weed without stooping, bending or touching the weed.

BACKGROUND OF THE INVENTION

Weeds disfigure lawns and crowd out desirable plants. It is not a simple matter to get rid of a weed because of the weed's extensive root structure. Simply pulling or cutting off the above-ground portion of a weed is usually not sufficient since the weed will most likely recover.

DESCRIPTION OF THE PRIOR ART

Various methods have been proposed for extracting weeds. In one method, a tool is inserted into the soil alongside a weed, and then with a levered action, the weed is lifted upwardly to extract it from the ground. Some of these tools have long handles so that the operator may use them while standing. Others require the operator to stoop, kneel or sit on the ground. Due to the levered action, a substantial amount of the soil surrounding the weed is removed. This not only creates large holes in the ground, but it also requires the operator to exert a substantial force.

Another tool for extracting weeds uses a cylindrical or rectangular tube-like element which is pressed over the weed into the soil. The tool is rotated to capture the weed's roots, and is then pulled upwardly to remove the weed from the ground. These tools may be used from a standing position and require less force than the levered action tools.

A common structural failure of such tools is loosening or breaking of the penetrating elements Another limitation is the high cost of manufacturing due to the numerous fasteners and welds required to secure the various components. An inconvenience inherent in the use of such tools is that the operator is required to touch and handle the weed while removing it from the gripping element.

Representative weed removal tools are disclosed in the following U.S. patents:

| | | |
|---|---|---|
| 3,152,788 | 3,293,674 | 3,608,644 |
| 3,865,348 | 3,976,282 | 4,135,700 |
| 4,243,206 | 4,281,866 | 4,400,029 |
| 4,603,744 | 4,641,712 | 4,673,165 |

OBJECTS OF THE INVENTION

The principal object of the present invention is to provide an improved weed extractor which can quickly remove weeds with the application of minimal force.

Another object of the invention is to provide an improved weed extractor which can quickly and easily extract a weed and its roots with a minimal amount of soil displacement.

Another object of the invention is to provide an improved weed extractor which can be operated in a standing position without bending, stooping or crouching.

Another object of the invention is to provide an improved weed extractor having an ejector for expelling the weed after it has been extracted from the ground.

Yet another object of the invention is to provide an improved lawn and garden tool which may be used for extracting weeds from the soil or alternatively to pick up refuse, litter, trash and the like from the ground surface and expel it into a container without personally touching or otherwise handling the weed or article of refuse which has been picked up by the tool.

Still another object of the invention is to provide an improved weed extractor which is durable, reliable and inexpensive to manufacture.

SUMMARY OF THE INVENTION

The foregoing objects are achieved according to a preferred embodiment of the present invention in a weed extractor tool having a torque bar and handle for operation in a standing position. A laterally offset handle on the upper end of the torque bar is used to manually rotate the torque bar. Attached to the lower end of the torque bar is a spike block from which a plurality of spikes project generally in axial alignment with the torque bar. A spring-loaded ejector carriage is slidably mounted onto the torque bar for extension and retraction relative to the spikes.

The tool is assembled by first force fitting the spikes into the spike block, rotating the spike block into the ejector carriage, inserting a spring between the spike block and ejector carriage, and then force fitting the torque bar into the spike block.

To extract a weed, the spikes are inserted into the soil around the central root core of the weed. As the handle is rotated, laterally extending roots are engaged around the spikes. The tool is then pulled upwardly to remove the spikes and entangled weed from the soil. The weed is expelled from the spikes by extending the ejector carriage.

This same tool can be used as a spear to pick up refuse and expel it without requiring the operator to personally touch the refuse.

The features of the invention which are believed to be novel are particularly pointed out and distinctly claimed in the concluding portion of this specification. The invention, however, both as to its operation and organization, together with objects and advantages thereof, may best be understood by reference to the following detailed description taken in conjunction with the accompanying drawings.

BRIEF DESCRIPTION OF THE DRAWINGS

FIG. 1 is a side elevational view of a weed extractor and expelling tool;

FIG. 2 is a side elevational view, partially broken away showing the tool of FIG. 1 inserted into soil around the central root core of a weed;

FIG. 3 is a bottom plan view of the tool shown in FIG. 1;

FIG. 4 is a perspective view, partially broken away, illustrating the ejector carriage of the weed extractor tool in the retracted, weed engaging position;

DETAILED DESCRIPTION OF THE PREFERRED EMBODIMENT

Figure 5:
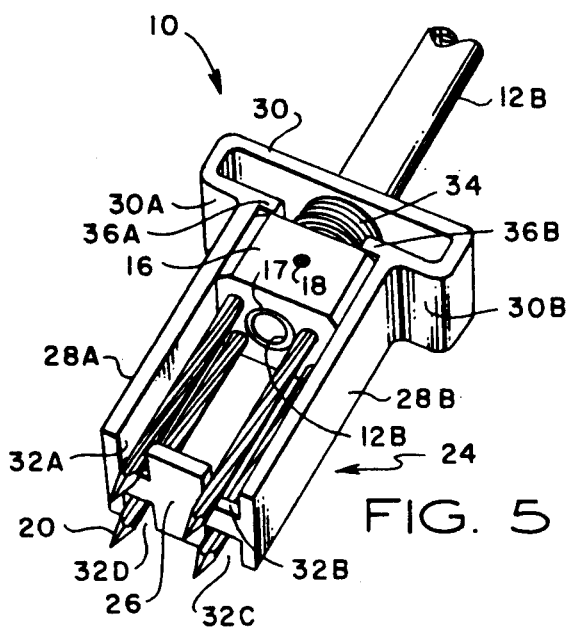
FIG. 5 is a perspective view similar to FIG. 4 illustrating the ejector carriage in its extended, weed expelling position.

In the description which follows, like parts are indicated throughout the specification and drawings with the same reference numerals, respectively. The drawings are not necessarily to scale and the proportions of certain parts have been exaggerated to better illustrate details of the present invention.

Referring now to FIG. 1, a weed extractor is indicated generally by reference number 10. The weed extractor 10 is operated by a torque bar 12 which has an upper end 12A and lower end 12B. Attached to the upper end 12A of the torque bar 12 is a laterally offset handle 14. The handle 14 has an offset arm 14A rigidly attached to the torque bar 12 by press fit engagement. Other attachment arrangements such as bolting, pinning, welding, or shaping the torque bar may be used to good advantage.

Figure 6:
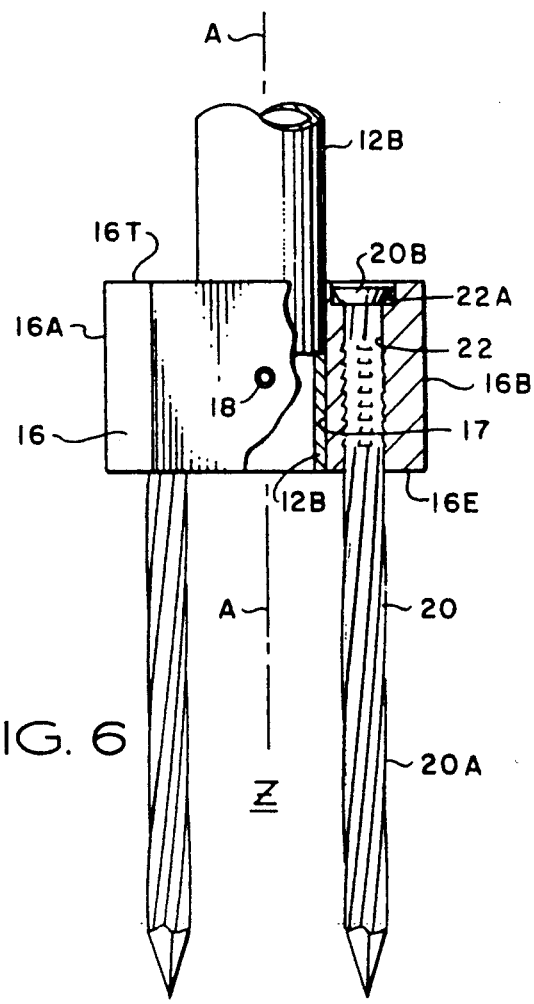
FIG. 6 is an enlarged side elevation of the spike block and spikes, partly in section and broken away at the bar.
Figure 9:
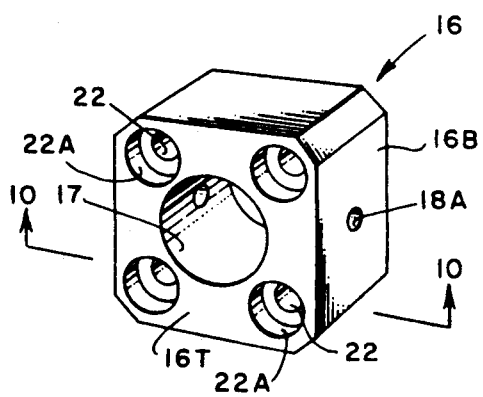
FIG. 9 is a perspective view of the spike block show in FIGS. 4, 5 and 6.

The lower end 12B of torque bar 12 is attached to a spike block 16. The attachment is preferably produced by force fitting the lower end 12B of torque bar 12 into a bore 17 formed in spike block 16 as shown in FIGS. 5, 6 and 9. In the preferred embodiment, the attachment is performed by press fitting torque bar 12 into the bore 17 drilled into spike block 16. The interference union is reinforced by a pin 18 which projects through a lateral bore 18A formed in the spike block 16 (FIG. 9).

Figure 7:
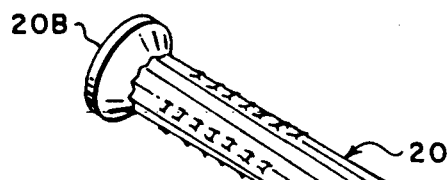
FIG. 7 is a perspective view of a spike.

Referring now to FIGS. 6 and 7, a plurality of spikes 20 are mounted through the spike block 16 in an interference press fit which holds them rigid and parallel to the axis A of torque bar 12. In the preferred embodiment, the spikes 20 have spiral ribs 20A which are force fitted through a plurality of bores 22 drilled into the block 16. The head 20B of each spike is received flush within a cylindrical counterbore 22A formed in block 16.

An interlocking union results between the spikes 20 and the spike block 16 due to extrusion of the block 16 caused by the interference fit of the spiral ribs 20A against the block bore 22. In order for a strong interlocking union to occur, the spikes 20 should be of a harder material than the block 16 and slightly larger in diameter than the bore 22 to produce an interference fit.

As can best be seen in FIGS. 3 and 4, the spikes 20 project from the block 16 generally in parallel alignment with the longitudinal axis A of the torque bar 12. The spikes are closely spaced in a symmetrical pattern with respect to the spike block bore 17. Because the spikes 20 are closely spaced, only a small soil plug is removed along with the weed and its roots. Upon insertion of the spikes 20 into the soil, and upon rotation of the spike block 16, the spikes 20 slice the soil in a cylindrical path, thereby producing a small plug which is easily lifted out of the ground.

A minimum of two spikes is required to produce the appropriate slicing action, with four spikes being employed in the preferred embodiment. By virtue of the spacing of the spikes, the spikes can be closely fitted adjacent to the root core of a weed and thereby avoid damage to nearby grass or other desirable plants. The spikes 20 also guide and stabilize the movement of an ejector carriage as described hereinafter.

An ejector carriage 24 is movably coupled for extension and retraction axially along the lower end 12B of the torque bar 12. As shown in FIG. 4, the ejector carriage 24 has an ejector plate 26 fitted between the spikes 20, side panels 28A, 28B slidably fitted about opposite sides 16A, 16B of the spike block, and a push plate 30 slidably mounted onto the torque bar 12. In the preferred embodiment, the ejector carriage is extruded as a unitary article of manufacture in which the parallel side panels 28A, 28B are integrally formed with the ejector plate 26 and the push plate 30.

The ejector plate 26 has four corner slots 32A, 32B, 32C and 32D, one for each spike 20, through which the spikes are received. The push plate 30 is flanged laterally at 30A, 30B relative to the side panels 28A, 28B to permit the operator's foot or hand to extend it. A bore 33 is formed through the push plate 30 for receiving the torque bar 12.

The longitudinal space along the axis A between the spikes 20 defines a passage Z through which the ejector plate 26 is movable in extension and retraction. As can best be seen in FIGS. 3 and 4, ejector guide arms 26A, 26B, 26C and 26D project laterally between adjacent pairs of spikes. According to this arrangement, movement of the ejector carriage 24 in extension and retraction is stabilized by engagement of the carriage against the spikes, thereby limiting rotation and angular displacement of the ejector relative to the spike block 16.

That is, the ejector guide arms 26A, 26B, 26C and 26D ride upon the spikes 20 thereby preventing rotation or tilting of the ejector carriage 24 as it is extended and retracted along axis A. Moreover, the side panels 28A, 28B are disposed in surface-to-surface engagement with opposite side surfaces 16A, 16B of the spike block, thereby further stabilizing axial movement of the ejector carriage 24. Stabilization of axial movement is also provided by engagement of the torque bar 12 against the bore 33 of push plate 30.

The ejector carriage 24 is axially movable along the torque bar 12 between retracted and extended positions. In the retracted position, shown in FIG. 4, the ejector plate 26 is engaged flush against the bottom end 16E of the spike block 16 and the push plate 30 is retracted along the torque bar 12. Interposed between the spike block 16 and the push plate 30 and coiled around the lower end of the torque bar 12 is a coil spring 34. In the preferred embodiment, the ejector carriage 24 is biased toward the retracted position by the spring 34. The ejector carriage 24 is movable axially along the torque bar 12 in a direction away from the handle 14 into its extended (expelling) position, shown in FIG. 5, by the application of pressure against the push plate 30.

Laterally projecting shoulders 36A, 36B are integrally formed with the ejector carriage 24. The shoulders 36A, 36B engage the top surface 16T of the spike block 16 as the ejector carriage 24 is extended. The shoulders 36 are dimensioned so that upon movement of the ejector carriage 16 into its fully extended position, the spring 34 is not fully compressed, thereby avoiding premature failure caused by overstressing the spring.

The tool 10 is assembled according to the following steps. First, the individual components are formed and all necessary bores and slots are shaped. The spikes 20 are then force fitted into the spike block 16. No adhesive or welds are necessary to secure the spikes 20 within the spike block 16 due to the interlocking union produced as the spike block is extruded by the spiral ribs 20A.

Figure 8:
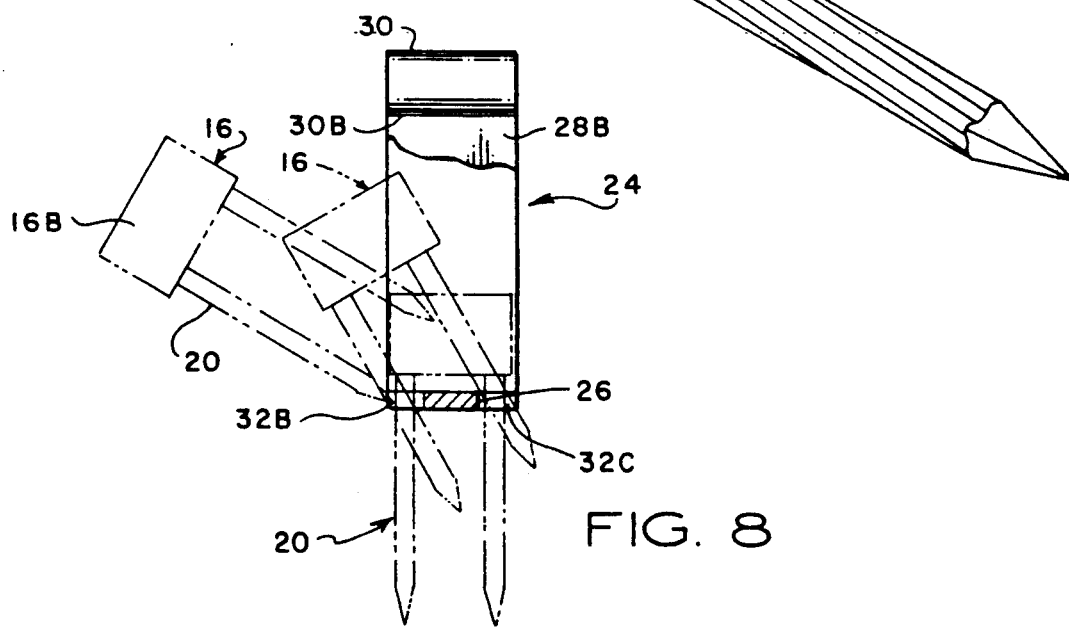
FIG. 8 is a side elevation view of the ejector carriage, partially in section, showing the method of placement of the spike block into the ejector carriage.

Next, as illustrated in FIG. 8, the spike block 16 is rotated into the space between the ejector side walls 28A, 28B into an aligned position inside the ejector carriage 24 with the spikes 20 projecting through the ejector plate slots 32A, 32B, 32C and 32D, respectively. The spring 34 is then inserted between the spike block 16 and the push plate 30 in alignment with the spike block bore 17 and push plate bore 33. The torque bar 12 is then inserted through the push plate bore 33, the coil spring 34 and spike block bore 17. The lower end 12B of the torque bar is fitted into the block bore 17 in an interference union, and is further secured by the pin 18.

Operation of the weed extractor tool 10 is illustrated in FIGS. 2 and 5. The weed extractor tool 10 is centered about the central root core R of a weed W and then inserted into the soil S by pushing downward on the torque bar 12 and handle 14. Once the weed extractor 10 is inserted into the soil S around the weed W, the handle 14 is rotated to engage the weed's roots around the spikes 20. As the tool 10 is pulled upwardly, the weed W, root ball and a small plug of soil are extracted.

To eject the weed W from the spikes 20, the operator extends the push plate 30, thereby driving the ejector carriage 24 into its extended position (FIG. 5). As the ejector plate 26 is extended, the weed W is expelled from the spikes 20. Extraction and expulsion of the weed are accomplished without requiring the operator to personally touch or otherwise handle the weed. Upon release, the coil spring 34 automatically returns the ejector carriage to its fully retracted position (FIG. 4). The weed extractor tool 10 is then ready to remove another weed.

An alternative spike block arrangement is illustrated in FIGS. 9–13. In the arrangement shown in FIG. 13, the spike block 16 is inverted with respect to the arrangement shown in FIG. 6. Moreover, spikes 40 are force fitted head first into the cylindrical bores 22 through the spike block face 16T.

Figure 10:
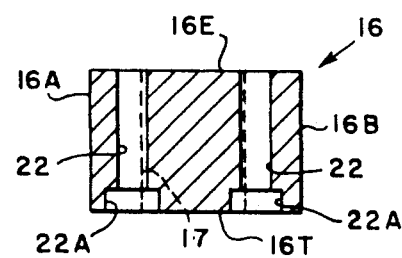
FIG. 10 is a sectional view of the spike block shown in FIG. 9, taken along the lines 10—10.
Figure 11:
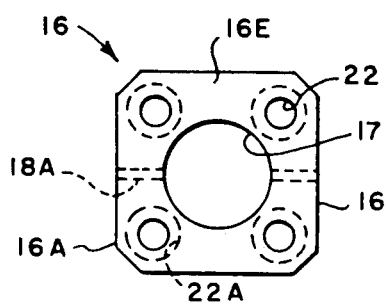
FIG. 11 is a top plan view of the spike block shown in FIG. 10.
Figure 12:
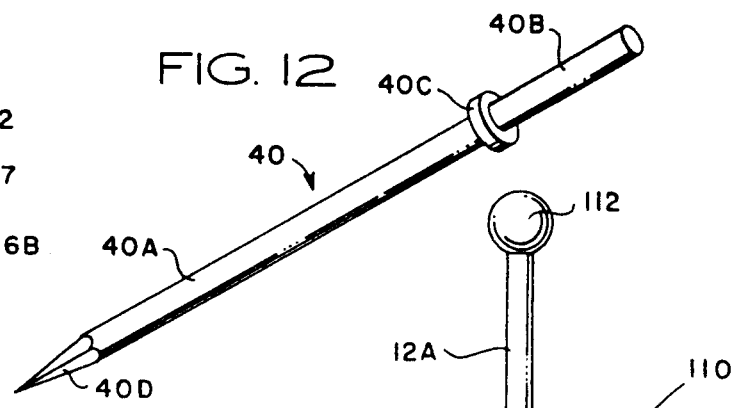
FIG. 12 is a perspective view of an alternative spike structure.
Figure 13:
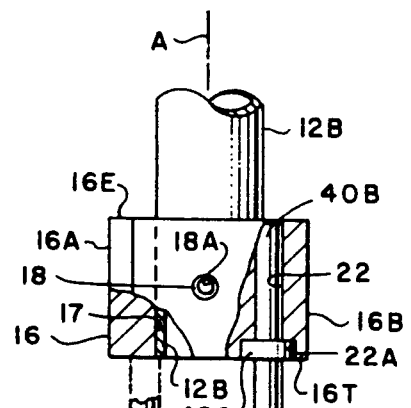
FIG. 13 is a elevation view, partly in section, and partially broken away, of an alternative spike block combination in which the spike block is inverted and spikes are force fitted within the inverted spike block; and, FIG. 14 is a side elevation view of an alternative embodiment in which the tool of FIG. 1 has been adapted for use as a litter lance.

The spike block 16 illustrated in FIGS. 9, 10 and 11 is identical with the spike block shown in FIGS. 2, 4, 5 and 6. Although a spike 20 having spiral ribs may be used in the configuration shown in FIG. 13, a gudgeon or spike 40 having smooth shank portions 40A, 40B can be securely fastened into the inverted spike block 16 in an interference union. The spike 40 is blocked against axial displacement which might result from upwardly directed impact forces by an integrally formed collar 40C. The collar 40C is a radially projecting, annular flange which is located intermediate the lower shank portion 40A and the upper head portion 40B of the spike 40. The collar 40C is received within the cylindrical counterbore 22A, with its upper face engaging the spike block 16. By this arrangement, impact forces are reacted substantially across the integrally formed collar 40C, thereby preserving the interference union between the spike head shank portion 40B and the spike block 16.

Referring again to FIG. 13, it will be seen that the head 40B and collar 40C of the gudgeon spike 40 are received flush within the bore 22 and counterbore 22A, respectively. The gudgeon spike 40 has a four sided point 40D and a smooth shank 40A which are well adapted for spearing aluminum cans, paper and other ground surface litter.

Figure 14:
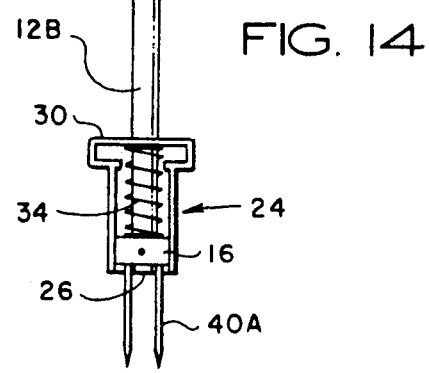

The tool 110 illustrated in FIG. 14 has a ball handle 112 attached onto the upper end 12A of bar 12. The tool 110 is thus adapted for use as a litter lance or spear. The ball 112 fits within the operator's palm when the tool 110 is used to impale litter. The ball 112 permits the operator to apply thrust rather than torque through the bar 12.

The inverted spike block arrangement, in which the spikes 40 are stabilized by an interference union and by the collar 40C, is particularly useful when the tool 10 or tool 110 is used as a lance or spear to pick up refuse such as paper, aluminum cans and other debris. Litter pickup and expulsion of the litter into a receptacle can be accomplished without requiring the operator to personally touch or otherwise handle the litter.

Although the invention has been described with reference to a specific embodiment, the foregoing description is not intended to be construed in a limiting sense. Various modifications to the disclosed embodiment as well as alternative applications of the invention will be suggested to persons skilled in the art by the foregoing specification and illustrations. It is therefore contemplated that the appended claims will cover any such modifications, applications or embodiments as fall within the true scope of the invention.

What is claimed is:

1. A tool for extracting weeds comprising, in combination:

a spike block having first and second side surfaces;
a plurality of spikes attached to said spike block;
a torque bar attached to said spike block;
an ejector carriage coupled to said torque bar for movement between retracted and extended positions relative to said spike block, said carriage having an ejector plate disposed between said spikes, a push plate movably coupled onto said torque bar, and side panel means connecting said push plate to said ejector plate, said side panel means including a first side panel and a second side panel, said first and second side panels being disposed in surface-to-surface slidable engagement with the first and second side surfaces, respectively, of said spike block; and,
said spike block having a plurality of bores in which said spikes are mounted, respectively, each spike bore having a counterbore, and each spike having a piercing shank portion, a head shank portion and an annular collar flange disposed intermediate said piercing shank portion and said head shank portion, said head shank portion being received in said spike bore in an interference union with said block, and said annular collar flange being received within said counterbore, with the piercing shank portion of said spike projecting from said block.

2. A tool for extracting weeds comprising, in combination:

a spike block;

a plurality of spikes attached to said spike block;
a torque bar attached to said spike block;
an ejector carriage coupled to said torque bar for movement between retracted and extended positions relative to said spike block, said carriage having an ejector plate disposed between said spikes, a push plate movably coupled onto said torque bar, and a side panel connecting said push plate to said ejector plate; and,
wherein said ejector carriage has an interior shoulder portion disposed between said push plate and said ejector plate, said interior shoulder portion being engagable by said spike block as said carriage is moved to an extended position relative to said spike block.

3. A lance for spearing ground surface litter, including paper, metal cans and the like comprising, in combination:
a support shaft having a longitudinal axis;
a spike block attached to said support shaft, said spike block having first and second side surfaces;
a spike attached to said spike block;
an ejector carriage coupled to said support shaft for movement between retracted and extended positions relative to said spike block, said ejector carriage having an ejector plate mounted for slidable movement along said spike, a push plate mounted for slidable movement along said support shaft, and a side panel assembly connecting said push plate to said ejector plate, said side panel assembly including a first side panel and a second side panel, said first and second side panels being disposed in surface-to-surface slidable engagement with the first and second side surfaces, respectively, of said spike block; and,
said spike block having a bore in which said spike is mounted, said spike bore having a counterbore, and said spike having a piercing shank portion, a head shank portion and an annular collar flange disposed intermediate said piercing shank portion and said head shank portion, said head shank portion being received in said spike bore in an interference union with said block, and said annular collar flange being received within said counterbore, with the piercing shank portion of said spike projecting from said block.

4. A lance for spearing ground surface litter, including paper, metal cans and the like comprising, in combination:
a support shaft having a longitudinal axis;
a spike block attached to said support shaft, said spike block having first and second side surfaces;
a spike attached to said spike block;
an ejector carriage coupled to said support shaft for movement between retracted and extended positions relative to said spike block, said ejector carriage having an ejector plate mounted for slidable movement along said spike, a push plate mounted for slidable movement along said support shaft, and a side panel connecting said push plate to said ejector plate; and,
wherein said ejector carriage has an interior shoulder portion disposed between said push plate and said ejector plate, said shoulder portion being engagable by said spike block as said carriage is moved to an extended position relative to said spike block.

* * * * *

UNITED STATES PATENT AND TRADEMARK OFFICE
CERTIFICATE OF CORRECTION

PATENT NO. : 5,004,283
DATED : April 2, 1991
INVENTOR(S) : John F. Sullivan

It is certified that error appears in the above-identified patent and that said Letters Patent is hereby corrected as shown below:

Column 1, line 42, "elements" should be -- elements. --.

Column 3, line 5, "show" should be -- shown --.

Signed and Sealed this

Eleventh Day of August, 1992

Attest:

DOUGLAS B. COMER

*Attesting Officer*  *Acting Commissioner of Patents and Trademarks*